US009521128B2

(12) United States Patent
Finlow-Bates

(10) Patent No.: US 9,521,128 B2
(45) Date of Patent: Dec. 13, 2016

(54) USING A HASH OF A FILENAME TO CONTROL ENCODING/DECODING OF A DIGITAL FILE

(71) Applicant: QUALCOMM Incorporated, San Diego, CA (US)

(72) Inventor: Keir Finlow-Bates, Kangasala (FI)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 14/535,628

(22) Filed: Nov. 7, 2014

(65) Prior Publication Data

US 2016/0134601 A1    May 12, 2016

(51) Int. Cl.
  *H04L 29/06*  (2006.01)
  *G09C 1/00*  (2006.01)
  *G06F 21/60*  (2013.01)
  *G06F 21/62*  (2013.01)

(52) U.S. Cl.
  CPC ........... *H04L 63/061* (2013.01); *G06F 21/602* (2013.01); *G06F 21/6209* (2013.01); *G09C 1/00* (2013.01); *H04L 63/0876* (2013.01); *G06F 2221/2107* (2013.01); *H04L 2209/16* (2013.01)

(58) Field of Classification Search
  CPC .............................. H04L 63/061; G06F 21/60
  USPC ......................................................... 713/165
  See application file for complete search history.

(56) References Cited

U.S. PATENT DOCUMENTS 8,065,534 B2   11/2011  Tan et al.
8,769,270 B2   7/2014  Orsini et al.
2005/0114709 A1   5/2005  Moore
2006/0149806 A1   7/2006  Scott et al.
2011/0246787 A1   10/2011  Farrugia et al.
2014/0325216 A1   10/2014  Lumb
2015/0310219 A1   10/2015  Haager et al.

FOREIGN PATENT DOCUMENTS

GB        2444343 A        6/2008

OTHER PUBLICATIONS

International Search Report and Written Opinion—PCT/US2015/055239—ISA/EPO—Jan. 20, 2016.
Bowers K.D., et al., "HAIL: A High-Availability and Integrity Layer for Cloud Storage," ACM conference on Computer and communications security (CCS), 2009, pp. 1-20.
Puzio P., et al., "Block-level De-duplication with Encrypted Data," Open Journal of Cloud Computing (OJCC), Jun. 2014, vol. 1 (1), pp. 10-18.

*Primary Examiner* — Dant Shaifer Harriman
(74) *Attorney, Agent, or Firm* — The Marbury Law Group, PLLC

(57) ABSTRACT

Methods, devices, systems, and non-transitory process-readable storage media for a computing device to reversibly obfuscate contents of a digital file includes generating a binary string by applying a shared hash function to a public filename of the digital file. The method may include subdividing the digital file into a first plurality of data segments corresponding to one of a number of bits represented by the generated binary string and a file size of the digital file, shuffling the first plurality of data segments using a shared, looping shuffle algorithm. Each shuffling operation of the shared, looping shuffle algorithm may use a different bit of the generated binary string in a predefined first sequence. The shuffled first plurality of data segments may be combined to obtain a shuffled digital file. A reverse of the method may be performed to obtain the original digital file.

28 Claims, 9 Drawing Sheets

```
{
Define f as File of Bytes
Define h as 256 Bit Unsigned Integer
Define depth, maxdepth, index, blocks as Integer f.location = "\\fileserver\folder\";
f.name = "myfile.ext";
open f;

' Pad file out to a number of bytes that is a power of 2
while log2(f.length) != floor(log2(f.length)) do ' In this case we are padding with zeroes
        f = f + Chr$(0);

end do;

' get the hash of the filename into a variable
h = SHA256(f.name);

' index will count how many bits we have used from the hash
index = 0;

' with a 256 bit hash we have enough bits in h to go down to
' a depth of 8, resulting in 256 blocks to potentially shuffle
' but the maxdepth may be less if the file is small so check this
maxdepth = min(log2(File.length),8);

for depth = 1 to maxdepth blocks = 2^depth;
        blocksize = f.length / blocks;
        for b = 0 to (blocks - 1) step 2 index = index + 1;
                ' note: h[k] for type 256 Bit Unsigned Integer returns the value of the kth bit
                if h[index] == 1 then ' swap blocks b+1 and b+2
                        ' note: f[1..0] = NULL and f[f.length+1..X] = NULL in this example
                        f = f[1..(b*blocksize)]
                            + f[(((b+1)*blocksize)+1)..((b+2)*blocksize)]
                            + f[((b*blocksize)+1)..((b+1)*blocksize)]
                            + f[(((b+2)*blocksize)+1)..((b+3)*blocksize)];

endif next b next depth save f;
}
```

FIG. 5

USING A HASH OF A FILENAME TO CONTROL ENCODING/DECODING OF A DIGITAL FILE

BACKGROUND

Users often share and distribute large data files over various networks, such as via peer-to-peer (P2P) file transfer systems over the Internet. For example, a user can redistribute parts of a particular file in small pieces to other users, allowing many servers with low upload rates to combine the pieces together to provide the whole file to other users at a reasonable speed. Files are often broken up into smaller pieces, and users may utilize seeds to upload various pieces of a broken-up file. For example, a 2 gigabyte (GB) file might be split into 1.5 MB pieces that each may be uploaded by a different client or user. Such P2P transfer approaches often utilize contiguous segments of the original file (e.g., files are broken up and uploaded in their original context). However, the security of using such contiguous segments may be insufficient for certain applications, as unauthorized or unintended recipients (e.g., snoopers, etc.) may be able to piece sensitive files together from various sources given enough time.

SUMMARY

Various embodiments provide methods, devices, systems, and non-transitory process-readable storage media for a computing device to reversibly obfuscate contents of a digital file. An embodiment method may include operations for generating a binary string by applying a shared hash function to a public filename of the digital file, subdividing the digital file into a first plurality of data segments corresponding to one of a number of bits represented by the generated binary string and a file size of the digital file, shuffling the first plurality of data segments using a shared, looping shuffle algorithm, wherein each shuffling operation of the shared, looping shuffle algorithm uses a different bit of the generated binary string in a predefined first sequence, and combining the shuffled first plurality of data segments to obtain a shuffled digital file.

In some embodiments, the method may further include subdividing the shuffled digital file into a second plurality of data segments corresponding to one of the number of bits represented by the generated binary string and the file size of the digital file, un-shuffling the second plurality of data segments by executing the shared, looping shuffle algorithm in a reverse manner in which each un-shuffling operation of the reversibly-executed shared, looping shuffle algorithm uses a different bit of the generated binary string in a predefined reverse sequence, and combining the un-shuffled second plurality of data segments to obtain the digital file. In some embodiments, the method may further include removing padding data segments from the un-shuffled second plurality of data segments. In some embodiments, the method may further include padding the digital file to have a total size equal to a power of two. In some embodiments, the method may further include storing the shuffled digital file. In some embodiments, the method may further include transmitting the shuffled digital file with the public filename to another computing device.

Further embodiments include a method for recovering the original digital file by reversibly executing the shared, looping shuffle algorithm on the shuffled digital file using with the shared hash function and the public filename to obtain the digital file. A shuffled digital file that is processed by reversibly executing the shared, looping shuffle algorithm may be obtained from memory of the computing device, or received from another computing device. In some embodiments, the shared hash function and the shared, looping shuffle algorithm may be associated with a file-sharing application that exchanges shuffled digital files.

Further embodiments include a computing device configured with processor-executable instructions for performing operations of the methods described above. Further embodiments include a non-transitory processor-readable medium on which is stored processor-executable instructions configured to cause a computing device to perform operations of the methods described above. Further embodiments include a communication system including a computing device configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 5 is a diagram illustrating exemplary pseudocode for implementing a shuffling algorithm according to some embodiments.

DETAILED DESCRIPTION

Figure 1:
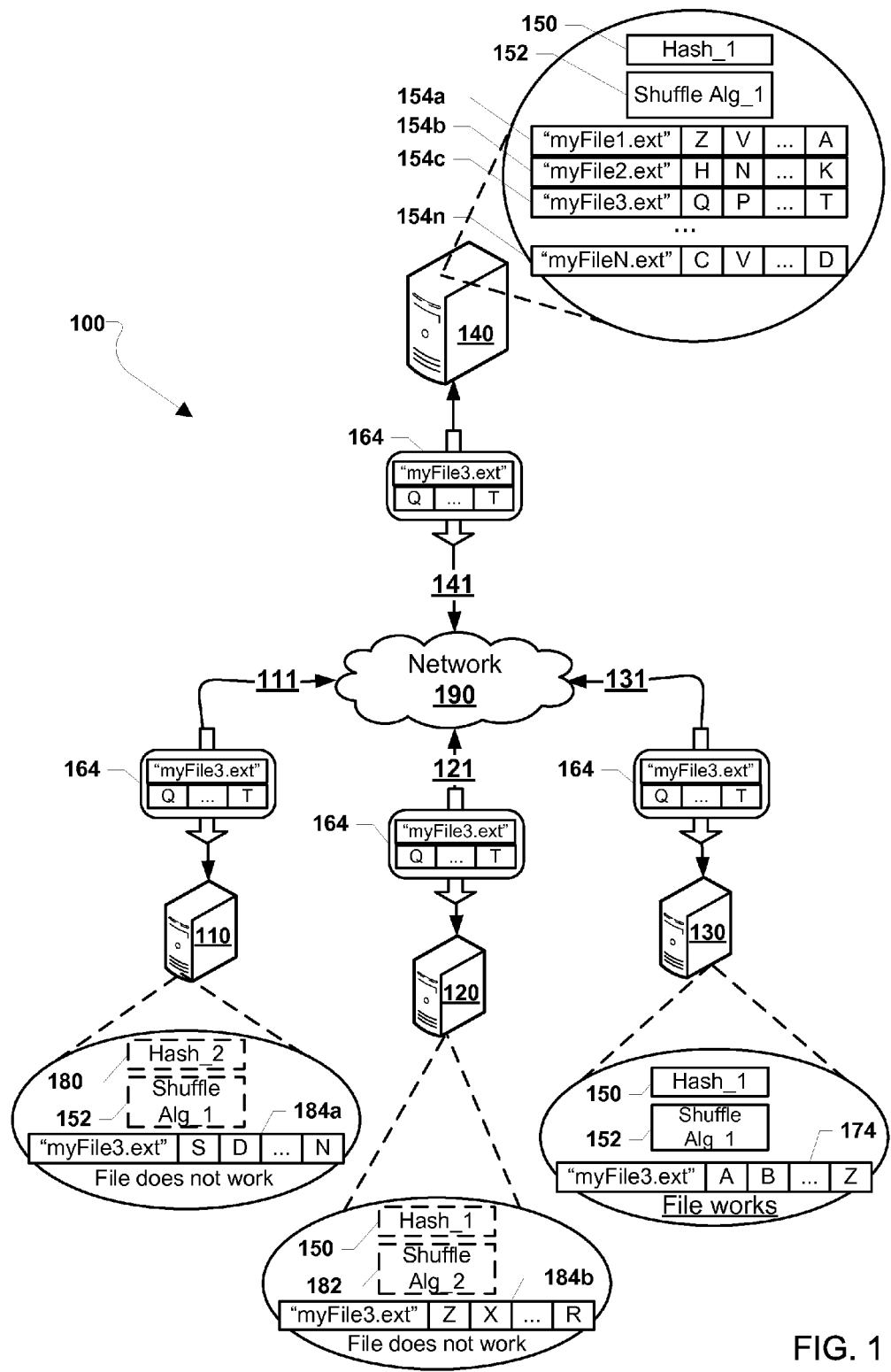
FIG. 1 is a component block diagram of a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments include a method that may be implemented in computing devices to obfuscate files using a hash of the file name as a seed to an obfuscation algorithm, such as a shuffling algorithm. Using a hash of the file name simplifies the process by which a receiver computing device can reverse the obfuscation process, such as a shuffling algorithm, to recover the file. The sending and receiving computing device need only share the hash function used to generate the seed for the obfuscation algorithm to be able to share files with a high degree of security.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of cellular telephones, smart-phones, web-pads, tablet computers, Internet enabled cellular telephones, Wi-Fi® enabled electronic devices, personal data assistants (PDA's), servers, laptop computers, personal computers, and similar electronic devices equipped with at least a processor. In various embodiments, such devices may be configured with at least one network transceiver (or interface) to establish a wide area network (WAN) or local area network (LAN) connection (e.g., an LTE, 3G or 4G wireless wide area network transceiver, a wired or wireless connection to the Internet via Wi-Fi®, etc.).

The term "server" is used to refer to any computing device capable of functioning as a server, such as a master exchange server, web server, mail server, document server, and a personal or mobile computing device configured with software to execute server functions (e.g., a "light server"). A server may be a dedicated computing device or a computing device including a server module (e.g., running an application which may cause the computing device to operate as a server). A server module (or server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

The terms "shuffle" and "shuffling" are used herein to refer to operations to scramble, un-sort, obfuscate, reorganize, and/or otherwise rearrange data. For example, shuffling file segments may include swapping the order of the file segments. Shuffling may be considered a form of encoding. Similarly, "un-shuffle" and "un-shuffling" are used herein to refer to operations to de-scramble, undo obfuscations, and/or otherwise reverse the rearrangement of data (i.e., "reverse shuffling"). For example, un-shuffling file segments that have been shuffled may include swapping the order of the shuffled file segments to return them to their original order. Un-shuffling may be considered a form of decoding. In various embodiments, such shuffling and un-shuffling operations may be performed by a computing device as part of "looping" algorithms that may include one or more iterations or operational loops that each comprise various calculations, comparisons, and other operations for systematically shuffling or un-shuffling data. Looping algorithms or functionalities may be implemented in various forms, such as routines, instructions, logic, applications, circuitry, etc.

There exist many different conventional hash functions (e.g., Secure Hash Algorithm (SHA), SHA-128, SHA-256, SHA-512, etc.) for generating hash output values of various bit lengths. For example, a SHA-128 hash algorithm can convert an input string into a 128-bit binary string. Further, there are many conventional algorithms for obfuscating data. However, conventional techniques do not enable encoding and decoding data segments of shared digital files in a reversible manner that is based on a hash of a public filename of the data to be shuffled/un-shuffled.

The various embodiments provide methods, devices, systems, and non-transitory process-readable storage media for controlling the encoding/decoding of files to improve security, such as when sharing the files between users. In general, a computing device performing embodiment techniques may shuffle a digital file by utilizing the public (or "in-the-open") filename of the file to generate inputs for a shuffling algorithm that procedurally places the segments of the file out of their original order. In other words, using the filename to control the algorithm, the digital file may be split into pseudo-randomly shuffled pieces, each of which may not contain any contiguous extract of the original form of the file. The same or another computing device may un-shuffle the digital file to access the data in the file by using the shuffling algorithm in a reverse manner (e.g., a reverse configuration, or an un-shuffling algorithm that reverses the shuffling data shifts, etc.) along with the public filename (i.e., inputs to the algorithm based on the filename). When the type or identity of the algorithm(s) and the manner in which the public filename is used to generate inputs to the algorithms is known, encoding and decoding may be achieved to provide obfuscation of files and thus provide an improved level of security when sharing or locally storing files.

A hash of the public filename may be used as a convenient input to the shuffling algorithm because the filename is both easy to acquire for various users and typically uniquely tied to the content of the digital file. For example, a music file (e.g., MPEG-1 or MPEG-2 audio layer III file, etc.) may have a filename "AlbumASongX.mp3" that indicates the particular media content the music file represents, and is also unlikely to be found on other files that do not represent the same media content.

In order for the public filename of the digital file to be used as an input to the shuffling algorithm in a manner that provides security between the sender and receiver, the sending computing device may apply to the public file name a hash function that is shared with the receiving computing device in order to generate an n-bit binary string (or hash output) that serves as a seed for the shuffling algorithm. For example, by applying a hash function to a filename, such as "AlbumASongX.mp3", a binary string (e.g., "000 . . . 1010", etc.) may be generated.

The bits of the generated binary string may be used to drive individual decisions or other data shuffling operations of the shuffling algorithm. In particular, when applied in various shuffling algorithms, the n-bit hash output may be used to control the swapping, scrambling, or procedural shuffling of individual segments of the digital file. For example, each bit of the n-bit hash output may be used to determine whether two segments of the file are to be swapped. As a further example, particular segments (or groupings of segments) of the digital file may be shuffled one time for each bit in the n-bit hash output. As an example of a shuffling algorithm, a file may be recursively divided, with each piece potentially swapped once according to different bits in the n-bit hash output that is used as a seed for the shuffling algorithm. Various, standard shuffling algorithms may be used in the various embodiment methods, such as known shuffling algorithms common to a community, predefined, and/or identified or shared in association with a particular file transfer.

Shuffling (or un-shuffling) driven by the hash output may be pseudo-random but repeatable and reversible, as the filename of a shuffled file, along with the exact hash function and shuffling algorithm, are the keys to programmatically affecting and reversing the shuffling. In some embodiments, a secret key for the hash function may also be required, such as a predefined section number of a file to be distributed. For example, a recipient of a shuffled data file may use the associated filename with a shared hash function that may be seeded with a secret key to create the n-bit hash function that indicates a number of un-shuffling operations (e.g., one operation per bit) needed to decode the file.

Thus, configured with the shared hash function and the shared shuffling algorithm, a recipient computing device (or the computing device itself) may use the file name of a received file reverse shuffling operations to obtain a working, original file. For example, a recipient device may iteratively un-swap small segments and then un-swap larger segments using a binary string based on the hash of the filename until the file is recovered. In this way, as long as the filename, hash function, and shuffling algorithms are known between two parties, file shuffling may be affected and reversed by various users. Such shuffled files may be more secure, especially when transmitted over a network (e.g., Internet, etc.) as the files may be harder to read or access by other devices that do not have all of these encoding/decoding components.

In some embodiments, files may be padded in order to provide enough data segments for shuffling. In particular, when a file size of the file to be shuffled cannot be divided by two without a remainder (i.e., it is not a power of two) or does not include a number of data segments that is a power of two (2) (e.g., $2^1$, $2^2$, $2^3$, $2^n$, etc.), the computing device may insert, append, and/or add null, blank, and/or noise data segments to the front, back, and/or any other predefined locations within the data segments of the file. For example, when the file to be shuffled can be subdivided into three 256 kilobyte (KB) data segments, a fourth 256 KB data segment of zeroes or noise may be added to the end of the three data segments in order to make the entire set to be shuffled equal a power of two (2) (e.g., 1024 KB). Similarly, in some embodiments, the public filename may be padded in order to produce enough data in the output (i.e., seed) to enable the shuffling algorithm thoroughly shuffling the file. For example, before running the hash function in order to generate enough bits for the shuffling algorithm (e.g., a power of two), the computing device may pad the filename with a number of null characters. As another example, noise or zeroes may be added to the filename in order to create an output hash that gives the shuffling algorithm the correct number of bits to handle the total number of segment divisions needed based on the size of the file. In some embodiments, when files or filenames are padded, the final shuffled file may include data or other indicators that indicate the padding that was added to the file name, such as a flag that is set to indicate a certain number of characters need to be added or a method of generating the characters to be added to the filename in order to produce the appropriate hash output for an un-shuffling algorithm.

The embodiment method differs from methods that use file names or a hash of the file name to segment and catalogue data conventional in that a hash function output is used to drive the shuffling of data segments that are recombined as shuffled files in order to improve security, especially for file-sharing scenarios. In other words, embodiment techniques use public filenames along with shared hash functions and shared shuffling algorithms to provide repeatable, reversible encoding/decoding schemes.

The embodiment techniques may improve the functioning of a computing device by improving security of files that are stored on and/or exchanged with other computing devices over various networks. By using shared hash functions in combination with public data (e.g., in-the-open filenames), computing devices configured to execute embodiment operations may easily, programmatically, and reversibly process files to provide basic file obfuscation without expending extensive operations or resources for more robust encryption schemes. Simple encoding algorithms may be use to act as a basic security measure for data used by computing devices, allowing computing devices to allocate time and operations to other processes instead of encrypting/decrypting operations required by some conventional file security techniques. Such reversible encoding may further improve the functioning of computing devices by enabling basic obfuscation of locally stored data, thereby decreasing the need for local applications and/or operations that are required to protect the security of sensitive information. For example, a computing device may utilize a lower-level firewall and/or virus protection scheme to protect data that is obfuscated by embodiment techniques, as any breaches may not directly reveal sensitive information shuffled within the data files.

The embodiment techniques may be beneficially used in various contexts. In particular, as there may be size limits to files that can be attached to communications (e.g., email, short-message service (SMS) texts, etc.), and when such communications are sent in plain text, shuffling by the embodiment techniques may be used to improve security when sending files as attachments (e.g., email attachments). Further, the embodiment techniques may also be used to transmit a file through a firewall that blocks out specific file types, as shuffled files may not be recognized as the blocked types and/or individual shuffled segments may be transmitted that may pass through the firewall. Another potential benefit may include using the embodiment techniques to improve a file system by implementing the shuffling techniques as a lightweight data obfuscation system rather than implementing a more processor-intensive, stronger cryptographically-protected file system. Such an implementation in a file system may allow a trade-off between security and speed of access.

FIG. 1 illustrates a communication system 100 suitable for use with various embodiments. The system 100 may include various computing devices 110, 120, 130, 140 connected via a network 190, such as a local area network (LAN) (e.g., a wired or wireless LAN, such as a WiFi® LAN, etc.) and/or a wide area network (WAN), such as a cellular network (e.g., $4^{th}$ Generation (4G), Long-Term Evolution (LTE), etc.), and/or the Internet. For example, a first computing device 110 may be connected to the network 190 via a wired or wireless connection 111, a second computing device 120 may be connected to the network 190 via a wired or wireless connection 121, a third computing device 130 may be connected to the network 190 via a wired or wireless connection 131, and a fourth computing device 140 may be connected to the network 190 via a wired or wireless connection 141. The computing devices 110, 120, 130, 140 may exchange communications via the network 190 using various conventional communication standards, specifications, and/or protocols (e.g., Internet protocol (IP), etc.). In some embodiments, the computing devices 110, 120, 130, 140 may be configured to directly exchange messages with peer-to-peer communications, such as via Bluetooth® signaling, direct physical links (e.g., serial cables, etc.), and other wired or wireless communication techniques and mediums.

The computing devices 110, 120, 130, 140 may be configured to execute various applications, routines, software, clients, and/or other instructions, such as programs stored within their respective memories and executed via their respective processors. In particular, the computing devices 110, 120, 130, 140 may execute applications for conducting file-sharing, such as dedicated clients, operating system routines, and/or browser applications capable of accessing file-sharing services and data. For example, the computing devices 110, 120, 130, 140 may each execute a file-sharing application that enables the computing devices 110, 120, 130, 140 to query and exchange locally stored data files. Such file-sharing applications may enable the computing devices 110, 120, 130, 140 to request, transmit, and receive data files from one another, such as media files (e.g., music files, movies, photographs, etc.).

Further, such file-sharing applications, or alternatively other functionalities on the computing devices 110, 120, 130, 140 (e.g., separate programs configured to operate in combination with file-sharing applications, etc.), may be configured to execute hash functions to generate an output to be used as a seed for shuffling (or un-shuffling) the contents of data files so that the files can be shared with other computing devices with a level of security. For example, a hash function and a shuffle algorithm may be used by a file-sharing application to shuffle the data files available for sharing by a particular computing device and/or un-shuffle data files received from another computing device via a file-sharing application. In various embodiments, a file may be un-shuffled by a recipient computing device upon receipt from a sender device using a shared hash function applied to a filename for the file and a shuffling algorithm shared by the sender and recipient computing devices.

In some embodiments, files may be stored in an original form (i.e., un-shuffled) and shuffled when transmitted to other computing devices, may be stored in a shuffled state, or stored in both an original state (e.g., in a storage unit for local use) and a shuffled state (e.g., in a sharing buffer used for sharing). For example, files may be shuffled prior to transmission and in response to receiving a request for such files such that a computing device may only shuffle the data segments of the files prior to transmission to another computing device (e.g., a "just-in-time" encoding for delivery).

As an illustration, the computing devices 110, 120, 130, 140 may each participate in a file-sharing service (e.g., execute a common file-sharing application) such that each may query filenames and download various files from one another. The fourth computing device 140 may be configured to store various files 154a-154n available for sharing with the other computing devices 110, 120, 130 via the network 190. Each of the stored files 154a-154n may have a public filename that may be queried by the other devices 110, 120, 130. For example, the fourth computing device 140 may store n files, including a first file 154a having the filename "myFile1.ext," a second file 154b having the filename "myFile2.ext," a third file 154c having the filename "myFile3.ext", etc. Further, each of the files 154a-154n may include data segments that comprise the file contents and that establish the file size of the files 154a-154n (e.g., a file size that is a number of Bytes, kilobytes (KB), megabytes (MB), gigabytes (GB), etc.). For example, the first file 154a may be a music file that has a file size of 3 MB.

The fourth computing device 140 may be configured to perform embodiment techniques for shuffling and un-shuffling data segments as described herein. As shown in FIG. 1, the fourth computing device 140 may have performed shuffling operations on the files 154a-154n so that each is stored with its respective data segments shuffled. For example, instead of storing an original sequence of data segments (e.g., "A," "B," . . . "Z") for the files 154a-154n, the fourth computing device 140 may store the data segments of the first file 154a in a first shuffled sequence (e.g., "Z," "V," . . . "A"), the second file 154b in a second shuffled sequence (e.g., "H," "N," . . . "K"), and the third file 154c in a third shuffled sequence (e.g., "Q," "P," . . . "T"). As described herein, such shuffling operations may be performed in combination with a shared has function and a shared shuffling algorithm, such as a first hash function 150 (e.g., "Hash_1" in FIG. 1) and a first shuffle algorithm 152 (e.g., "Shuffle Alg_1" in FIG. 1) that are accessible to and otherwise executable by the fourth computing device 140. In other words, the files 154a-1545n may only be un-shuffled by other computing devices that utilize both the first hash function 150 and the first shuffle algorithm 152.

The first computing device 110 may be configured with the first shuffle algorithm 152 and a second hash function 180 (e.g., "Hash_2" in FIG. 1). The second hash function 180 may be a function that may not generate the same output information as the shared first hash function 150 given the same input. The second computing device 120 may be configured with a second shuffle algorithm 182 (e.g., "Shuffle Alg_2" in FIG. 1) and the shared first hash function 150. The second shuffle algorithm 182 may be operations that may shuffle or un-shuffle data in a different manner than the first shuffle algorithm 152, thus generating a different sequence of data segments than the first shuffle algorithm 152. The third computing device 130 may be configured with both the shared first hash function 150 and the first shuffle algorithm 152.

In response to receiving download requests or other transmissions from the other computing devices 110, 120, 130 requesting the third file 154c, the fourth computing device 140 may transmit a message 164 including data corresponding to the third file 154c, such as the public filename (e.g., "myFile3.ext") and the shuffled data segments (e.g., "Q", "P," . . . "T"). Such a message 164 may be transmitted over the network 190 to the other computing devices 110, 120, 130 simultaneously or at different times, such as based on the time of receipt of the individual download requests from the computing devices 110, 120, 130.

In order for the computing devices 110, 120, 130 to properly utilize the third file 154c, each must utilize a hash function and shuffling algorithm that corresponds with those utilized by the fourth computing device 140 to generate the contents of the message 164 (i.e., the first hash function 150 and the first shuffling algorithm 152). In response to receiving the message 164, the first computing device 110 may perform un-shuffling operations using the second hash function 180 and the first shuffle algorithm 152. The resulting file 184a may not be functional due to the data segments being in an incorrect order (e.g., "S," "D," . . . "N"). In response to receiving the message 164, the second computing device 120 may perform un-shuffling operations using the shared first hash function 150 and the second shuffle algorithm 182. The resulting file 184b may not be functional due to the data segments being in an incorrect order (e.g., "Z," "X," . . . "R"). In response to receiving the message 164, the third computing device 130 may perform un-shuffling operations using the shared first hash function 150 and the first shuffle algorithm 152, and thus may generate a resulting file 174 that is functional due to the data segments being in the original, correct order (e.g., "A," "B," . . . "Z").

Figure 2A:
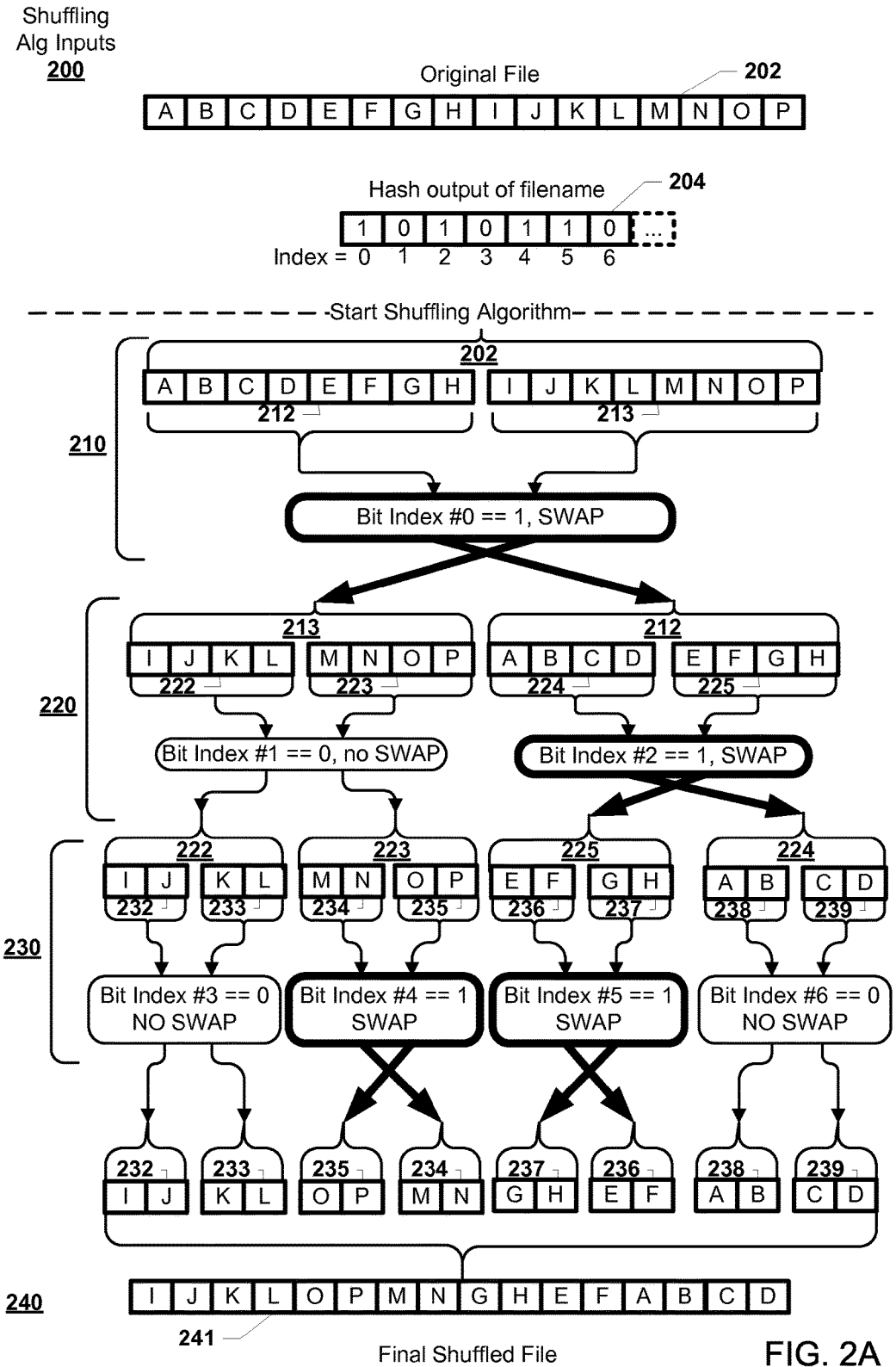
FIG. 2A is a diagram illustrating an exemplary shuffling (or encoding) of data segments of a file according to various embodiments.
Figure 2B:
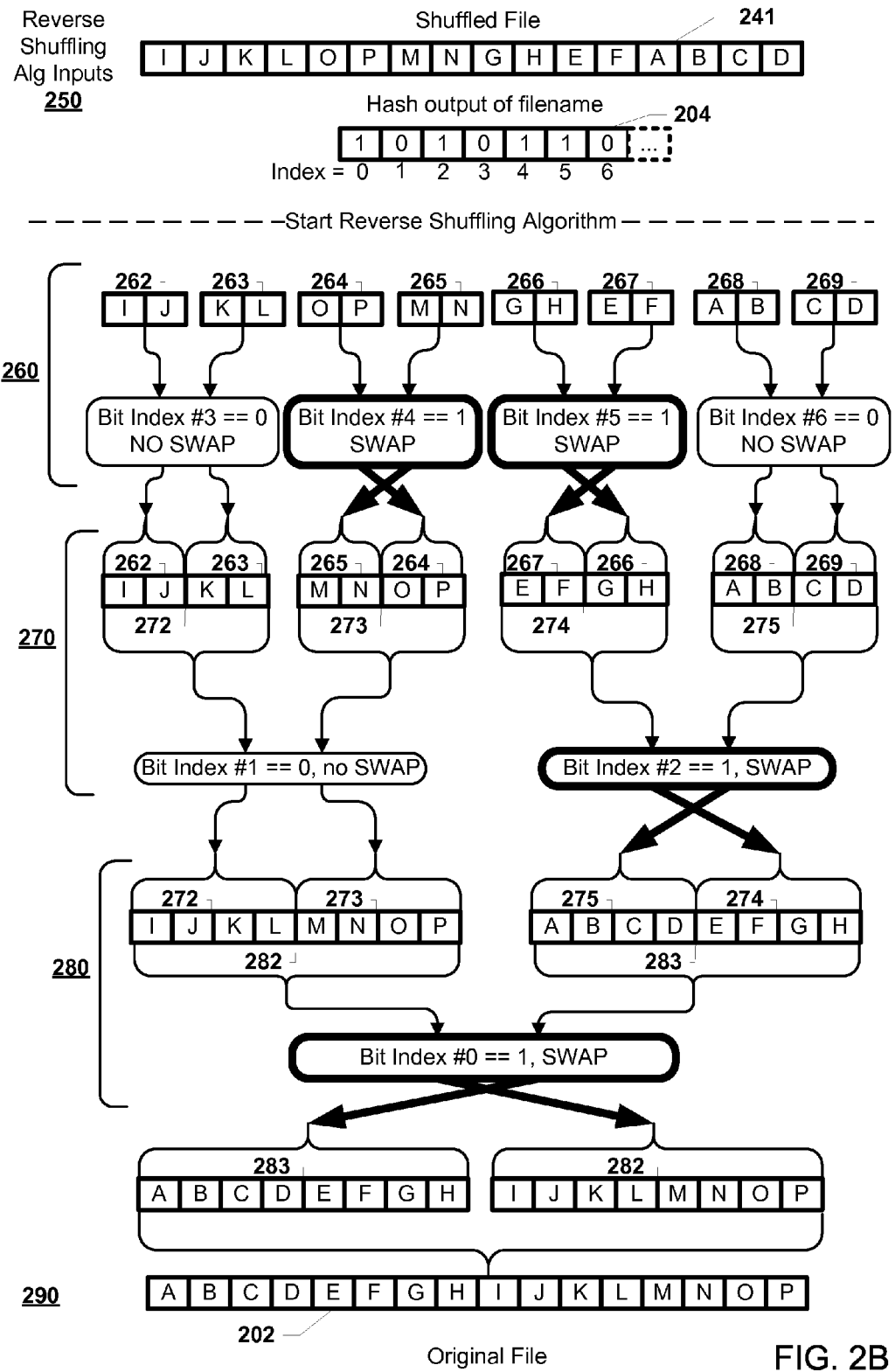
FIG. 2B is a diagram illustrating an exemplary un-shuffling (or de-coding) of data segments of a file according to various embodiments.

FIGS. 2A-2B illustrate an exemplary shuffling (or encoding) and un-shuffling (or de-coding) of data segments of a file according to various embodiments. Such shuffling and un-shuffling tasks may be performed by one or more computing devices configured with instructions for implementing embodiment techniques for shuffling/un-shuffling data segments (e.g., the third computing device 130 and/or the fourth computing device 140 of FIG. 1). For example, a desktop computer configured to execute software for executing shuffling and un-shuffling operations may shuffle a media file for storage and may un-shuffle the media file prior to or during local use (e.g., prior to playing the file with a media application, etc.). As another example, a server may shuffle a media file for transmission to a smartphone device, and in response to receiving the shuffled file, the smartphone device may un-shuffle the file so that it may be used locally (e.g., played with a media application). The shuffling operations illustrated in FIG. 2A may be enabled via execution of a shuffling algorithm (e.g., instruction set, routine, program, function, etc.), and the un-shuffling operations illustrated in FIG. 2B may be enabled via execution of the same shuffling algorithm in a different mode, configuration, and/or operation order that allows the data shuffling to be reversed. For example, a file may be shuffled using a shuffling algorithm in a first mode (e.g., encode mode), and the file may be un-shuffled using the same shuffling algorithm in a second mode (e.g., decode or reverse mode). In some embodiments, the shuffling operations and the un-shuffling operations illustrated by FIGS. 2A-2B may be accomplished by different but paired or complementary software, applications, routines, instructions, functions, algorithms, etc.

With reference to FIG. 2A, a computing device may first obtain inputs 200 for a shuffling algorithm. In particular, the computing device may obtain an original file 202 (e.g., a 1 MB mp3 music file with the filename of "mySong.mp3") to be shuffled. The original file 202 may have data segments in order (e.g., shown as "A" to "P" in alphabetical order). Further the computing device may generate an n-bit hash output 204 (e.g., the bit string "1010110 . . . ") by applying a shared hash function (e.g., SHA-512, etc.) to the filename of the original file 202 ("mySong.mp3"). With the original file 202 and the hash output 204, the computing device may execute a looping, shuffling algorithm to iteratively shuffle and combine individual data segments of the original file 202, thereby encoding the original file 202.

In a first iteration 210 of such a shuffling algorithm, the computing device may divide the original file 202 into two equal-sized subdivisions or segments 212, 213 (e.g., two 512 KB subdivisions) and may evaluate the first bit of the hash output 204. As the first bit (i.e., index '0' of the hash output 204) is a '1' value, the computing device may swap the two segments 212, 213. In other words, the second segment 213 may be placed before the first segment 212.

In a second iteration 220 of the shuffling algorithm, the computing device may subdivide (e.g., halve) each of the two segments 212, 213 to make four segments 222, 223, 224, 225 (e.g., four 256 KB subdivisions), and may evaluate the second bit of the hash output 204 (i.e., index '1' of the hash output 204) with the third and fourth segments 222, 223 and the third bit of the hash output 204 (i.e., index '2' of the hash output 204) with the fifth and sixth segments 224, 225. As the second bit is a '0' value, the third and fourth segments 222, 223 may not be swapped. As the third bit is a '1' value, the fifth and sixth segments 224, 225 may be swapped. In other words, the sixth segment 225 may be placed before the fifth segment 224.

In a third iteration 230 of the shuffling algorithm, the computing device may subdivide (e.g., halve) each of the four segments 222-225 to make eight segments 232-239 (e.g., eight 128 KB subdivisions), and may evaluate the fourth bit of the hash output 204 (i.e., index '3' of the hash output 204) with the seventh and eighth segments 232, 233, the fifth bit of the hash output 204 (i.e., index '4' of the hash output 204) with the ninth and tenth segments 234, 235, the sixth bit of the hash output 204 (i.e., index '5' of the hash output 204) with the eleventh and twelfth segments 236, 237, and the seventh bit of the hash output 204 (i.e., index '6' of the hash output 204) with the thirteenth and fourteenth segments 238, 239. As the fourth bit is a '0' value, the seventh and eighth segments 232, 233 may not be swapped. As the fifth bit is a '1' value, the ninth and tenth segments 234, 235 may be swapped. In other words, the tenth segment 235 may be placed before the ninth segment 234. As the sixth bit is a '1' value, the eleventh and twelfth segments 236, 237 may be swapped. In other words, the twelfth segment 237 may be placed before the eleventh segment 236. As the seventh bit is a '0' value, the thirteenth and fourteenth segments 238, 239 may not be swapped. In a combining operation 240 of the shuffling algorithm, the various shuffled segments may be combined to generate a final shuffled file 241. In some embodiments, the computing device may add a bit or other indicator (e.g., header information) to the combined, shuffled file 241 that indicates it is shuffled.

With reference to FIG. 2B, a computing device may obtain inputs 250 for an un-shuffling algorithm. In particular, the computing device may obtain a shuffled file 241 (e.g., a 1 MB shuffled file with the filename of "mySong.mp3") to be un-shuffled. The shuffled file 241 may be obtained via various operations, such as downloading from a remote server via a file-sharing application, receiving via a peer-to-peer connection, and/or loading from a local storage unit. The computing device may generate the n-bit hash output 204 (e.g., the bit string "1010110 . . . ") by applying a shared hash function (e.g., SHA-512, etc.) to the filename of the shuffled file 241 ("mySong.mp3"). As the same, shared hash function may be used, the hash output 204 may be the same in both FIG. 2A and FIG. 2B. In some embodiments, the computing device may identify that the shuffled file 241 is shuffled based on a bit or other indicator (e.g., header information) that indicates it is shuffled, or alternatively, based on a failed execution of the shuffled file. For example, the computing device may determine that a music file is shuffled in response to detecting an error when attempting to render the file via a media playing application.

With the shuffled file 241 and the hash output 204, the computing device may execute a looping, un-shuffling (or reverse shuffling) algorithm to un-shuffle and combine individual data segments of the shuffled file 241, thereby decoding the shuffled file 241. In a first iteration 260 of the un-shuffling algorithm, the computing device may divide the shuffled file 241 into eight equal-sized segments 262-269 (e.g., eight 128 KB subdivisions), and may evaluate the fourth bit of the hash output 204 (i.e., index '3' of the hash output 204) with the first and second segments 262, 263, the fifth bit of the hash output 204 (i.e., index '4' of the hash output 204) with the third and fourth segments 264, 265, the sixth bit of the hash output 204 (i.e., index '5' of the hash output 204) with the fifth and sixth segments 266, 267, and the seventh bit of the hash output 204 (i.e., index '6' of the hash output 204) with the seventh and eighth segments 268, 269. As the fourth bit is a '0' value, the first and second segments 262, 263 may not be swapped. As the fifth bit is a '1' value, the third and fourth segments 264, 265 may be swapped. In other words, the fourth segment 265 may be placed before the third segment 264. As the sixth bit is a '1' value, the fifth and sixth segments 266, 267 may be swapped. In other words, the sixth segment 267 may be placed before the fifth segment 266. As the seventh bit is a '0' value, the seventh and eight segments 268, 269 may not be swapped.

In a second iteration 270 of the un-shuffling algorithm, the computing device may subdivide the set of un-shuffled segments 262-269 to identify four segments 272-275 (e.g., four 256 KB subdivisions), and may evaluate the second bit of the hash output 204 (i.e., index '1' of the hash output 204) with the ninth and tenth segments 272, 273, and the third bit of the hash output 204 (i.e., index '2' of the hash output 204) with the eleventh and twelfth segments 274, 275. As the second bit is a '0' value, the ninth and tenth segments 272, 273 may not be swapped. As the third bit is a '1' value, the eleventh and twelfth segments 274, 275 may be swapped. In other words, the twelfth segment 275 may be placed before the eleventh segment 274.

In a third iteration 280 of the un-shuffling algorithm, the computing device may subdivide the set of un-shuffled segments 272-275 to identify two segments 282-283 (e.g., two 512 KB subdivisions), and may evaluate the first bit of the hash output 204 (i.e., index '0' of the hash output 204) with the thirteenth and fourteenth segments 282, 283. As the first bit is a '1' value, the thirteenth and fourteenth segments 282, 283 may be swapped. In other words, the fourteenth segment 283 may be placed before the thirteenth segment 282. In a combining operation 290 of the un-shuffling algorithm, the various shuffled segments may be combined to generate a final, un-shuffled file (i.e., the original file 202). For example, the final, un-shuffled file may have all data segments in order (e.g., shown as "A" to "P" in alphabetical order).

Figure 3A:
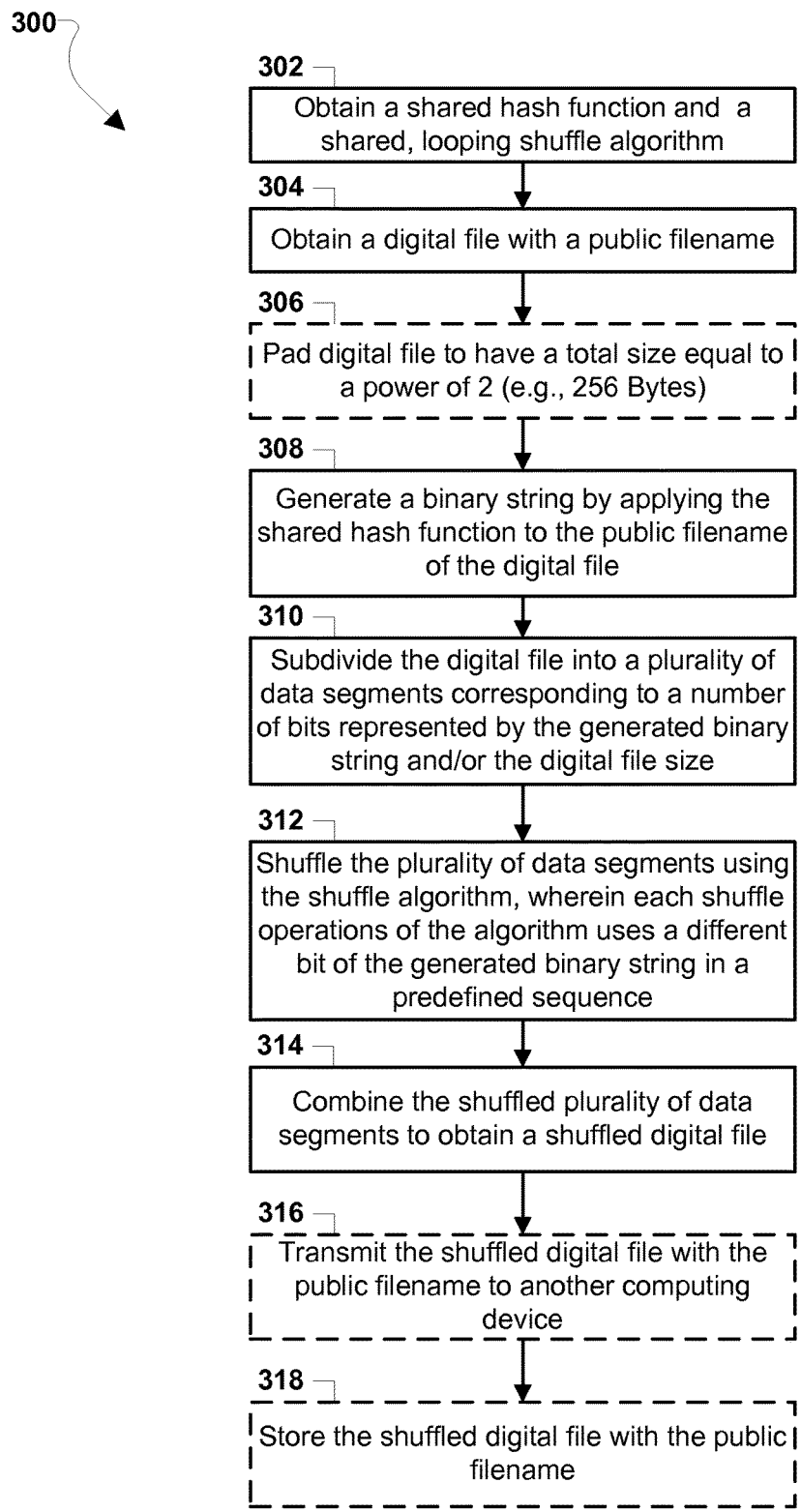
FIG. 3A is a process flow diagram illustrating an embodiment method for a computing device to shuffle (or encode) data segments of a digital file based on a hash output of a filename associated with the digital file.
Figure 3B:
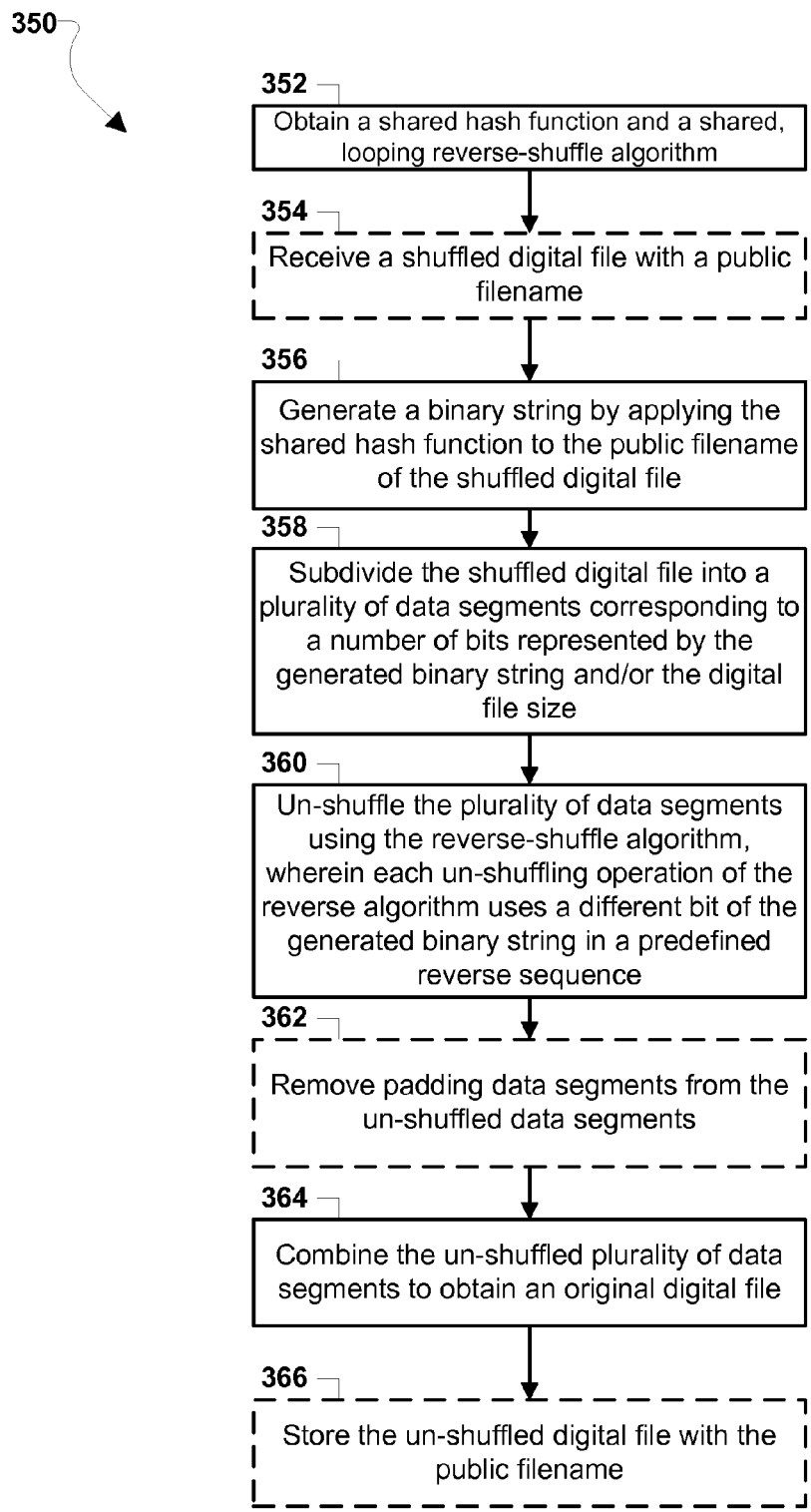
FIG. 3B is a process flow diagram illustrating an embodiment method for a computing device to un-shuffle (or de-code) data segments of a digital file based on a hash output of a filename associated with the digital file.

FIGS. 3A-3B illustrate embodiment methods 300, 350 for shuffling and un-shuffling data segments of digital files. The methods 300, 350 may be considered complements to one another, as the method 300 illustrated in FIG. 3A includes operations for shuffling data files that may be reversed by the un-shuffling operations (or reverse shuffling operations) of the method 350 illustrated in FIG. 3B. In some embodiments, the methods 300, 350 may be accomplished via the same functionality (e.g., software, application, logic, routine, etc.) that is configurable to perform either shuffling or un-shuffling operations. Alternatively, the methods 300, 350 may be performed via different functionalities (e.g., software, applications, logic, routines, etc.) that are paired or otherwise associated as providing the reverse operations of one another.

The operations of embodiment methods 300, 350 may be performed by various computing devices, such as user devices (e.g., smartphones, desktops, etc.) and/or servers participating in a file-sharing community. A single computing device may be configured to perform the embodiment operations of method 300 and/or method 350. In some embodiments, the operations of the methods 300, 350 may be performed as part of a file-sharing exchange, such as via a routine or protocol implemented to handle incoming and/or out-going files shared with other members of a file-sharing community. In some embodiments, the methods 300, 350 may be used for improving security of locally stored data, such as by shuffling and un-shuffling files that are archived or otherwise stored within a database or data structure within or accessible to a server, etc.

FIG. 3A illustrates an embodiment method 300 for a computing device to shuffle (or encode) data segments of a file based on a hash output of a filename associated with the file. In block 302, a processor of the computing device may obtain a shared hash function and a shared, looping shuffle algorithm. Obtaining the shared hash function and/or looping shuffle algorithm may include obtaining an identity of either functionality (e.g., a code for a particular hash function, seed, etc. that may already exist in storage on the computing device, etc.) and/or obtaining the code, instructions, software, and/or other information to implement the functionalities of the function and algorithm (e.g., a binary download, etc.). The shared hash function and/or looping shuffle algorithm may be preloaded on the computing devices (e.g., loaded by an equipment manufacturer), loaded by a user (e.g., installed with a file-sharing application, etc.), and/or received via an incoming message. For example, the computing device may receive a message from another computing device, such as a short message service (SMS) message, email, etc., that indicates a particular shared hash function and/or looping shuffle algorithm to use. The computing device may perform operations to download instructions, code, and/or other information to implement such a hash function or looping shuffle algorithm, such as downloading an executable from a remote server in response to receiving a message indicating the hash function and/or looping shuffle algorithm.

The hash function and looping shuffle algorithm may be shared with other devices or members associated with a particular service, manufacturer, and/or other grouping. For example, all devices having installed a particular application (e.g., a file-sharing application, an authentication routine, etc.) may be configured with the shared hash function and/or shuffling algorithm based on an installation of the application. In some embodiments, the hash function and/or shuffle algorithm may be obtained in response to the computing device performing login or handshaking operations with other devices (e.g., logging into a user account or a file-sharing service, peer-to-peer handshaking signaling, etc.).

In block 304, the processor of the computing device may obtain a digital file with a public filename. For example, the computing device may obtain the file based on user inputs (e.g., creating a file with user-supplied text, etc.), receiving the file from a communication (e.g., a download via IP, universal serial bus (USB), etc.), or retrieving data from an accessible storage unit (e.g., from an internal memory unit, a database, flash memory unit, etc.). A public filename may be a string or text (e.g., "mySoundFile.ext", etc.) that is able to be transmitted or otherwise rendered "in-the-open" and that may be associated with and/or descriptive of the contents of the digital file. For example, a public filename may be queried by other devices and/or services to indicate the digital file is available (or stored) on the computing device. In some embodiments, the public filename may itself be encoded or obfuscated.

In optional block 306, the processor of the computing device may pad the digital file to have a total size equal to a power of two (e.g., $2^n$ Bytes). In response to determining the current size of the digital file, the computing device may determine how many more bytes (e.g., kilobytes (KB), megabytes (MB), gigabytes (GB), etc.) of predefined, noise, or null data that should be added to the digital file in order to make the total file size equal to a power of two (e.g., $2^1$, $2^2$, $2^3$, $2^n$, etc.). For example, when the total file size of the digital file is only 192 KB, the computing device may calculate that another 64 KB of padding that should be added to the digital file so that the padded file has a size that is a power of two, namely 256 KB. The computing device may append that appropriate amount of predefined, noise, null, empty, or data segments to the obtained digital file (e.g., "pad" the digital file with the null data segments). For example, the computing devices may pad the digital file by adding null data segments to the front, back, middle, and/or any other place within the digital file based on a predefined scheme. The operations in optional block 306 may be optional when the digital file already has a size that is a power of two (2).

In block 308, the processor of the computing device may generate a binary string by applying the shared hash function to the public filename of the digital file. For example, by applying the shared hash function to the public filename, the computing device may generate a string of '0's and '1's. The length of the binary string may depend upon the size of the public filename and/or the hash function. In some embodiments, the computing device may perform padding operations to make the length of the binary string equal to a power of two. For example, when the generated binary string has only a length of 13 bits, the computing device may add 3 empty (i.e., '0' value) bits to the binary string to make it 16 bits in length (i.e., $2^4$).

Figure 4A:
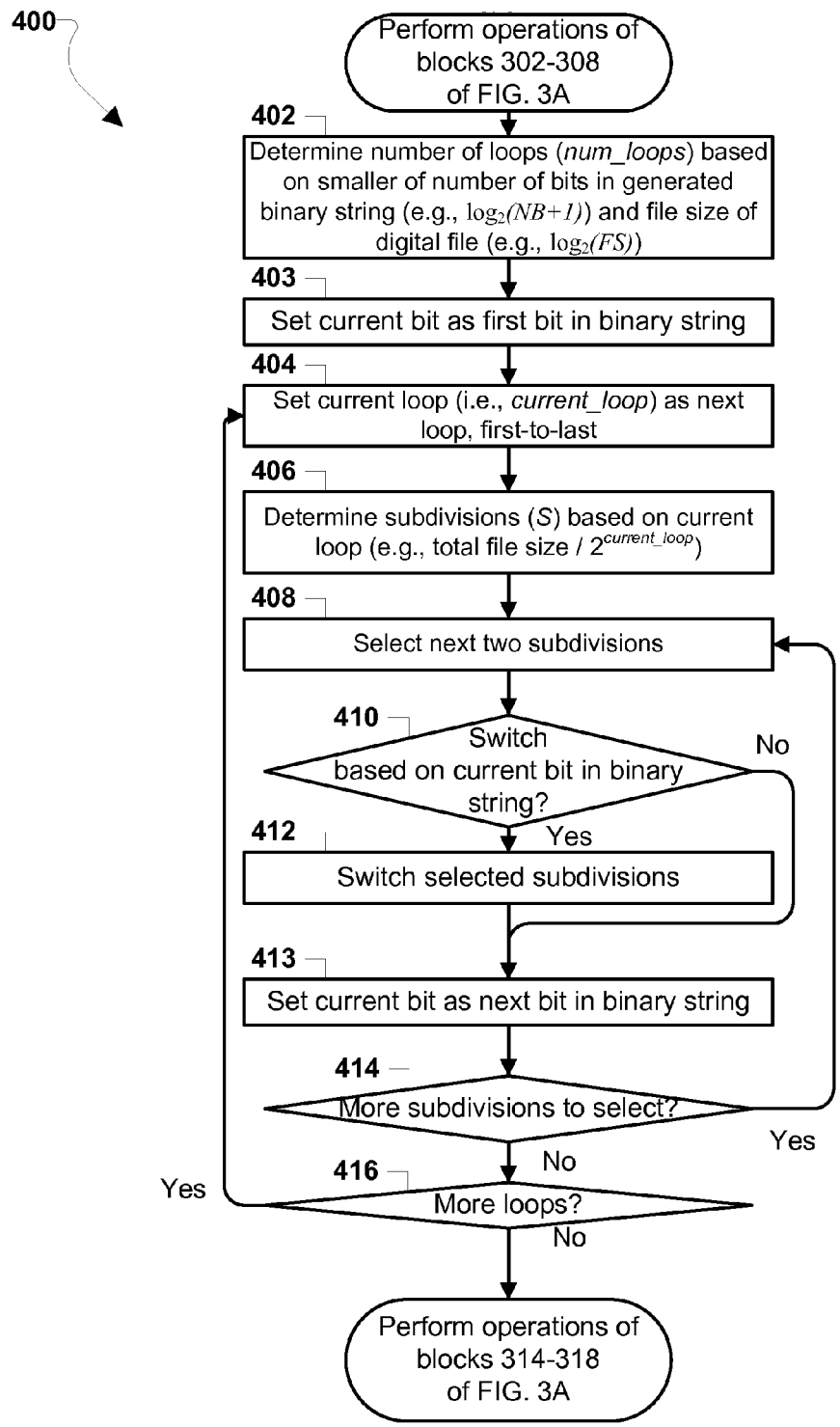
FIG. 4A is a process flow diagram illustrating another embodiment method for a computing device to shuffle (or encode) data segments of a digital file based on a hash output of a filename associated with the digital file.

In block 310, the processor of the computing device may subdivide the digital file into a plurality of data segments corresponding to a number of bits represented by the generated binary string and/or the digital file size. For example, in a simple implementation, the digital file may be subdivided such that there are two data segments for each bit in the binary string. As another example, the computing device may utilize a predefined minimum data segment size (e.g., 64 KB, etc.) as a base case for shuffling the digital file in a recursive manner. As another example, the computing device may utilize the number of bits in the binary string and the total digital file size to calculate the number of times (i.e., loops or depth) that the computing device may halve and shuffle the data (e.g., as shown in FIG. 2A). In some embodiments, the computing device may subdivide the digital file for a number of iterations (or loops) based on the smaller of the number of bits in the binary string and the result of $\lfloor \log_2(FS) \rfloor$, where FS is the file size (or length) of the digital file and "$\lfloor \; \rfloor$" is a floor function that returns an integer. FIG. 4A illustrates exemplary operations for subdividing and shuffling data segments.

In block 312, the processor of the computing device may shuffle the plurality of data segments using the shared, looping shuffle algorithm in which each shuffling operation of the algorithm uses a different bit of the generated binary string in a predefined sequence. The shuffle algorithm may use various techniques for programmatically shuffling, unsorting, scrambling, and/or otherwise reordering data segments. FIG. 2A shows one exemplary algorithm for shuffling data segments. Regardless of the shuffling scheme used, the computing device may be configured to drive operations of the shuffling based the bits of the binary string. In other words, decisions within the shuffling algorithm may be based on bit values of individual bits of the binary string. For example, a '1' value may indicate to the processor that it should affect a change via the shuffling algorithm, such as swapping adjacent data segments of the digital file, and a '0' value may indicate to the processor that it should avoid changes, or vice versa.

In block 314, the processor of the computing device may combine the shuffled plurality of data segments to obtain a shuffled digital file. For example, the computing device may append or link the various data segments to one another in order. In some embodiments, the computing devices may further add metadata, header information, and/or other information to the shuffled digital file that indicates whether the file has been shuffled, the file name, information about padding included in the file, and/or other information that may be used by the computing device and/or other devices to un-shuffle the digital file (e.g., hints for identifying hash functions or secret keys, timestamps, etc.).

In optional block 316, the processor of the computing device may transmit the shuffled digital file with the public filename to another computing device. For example, the computing devices may transmit the shuffled file via one or more IP packets over the Internet to a requesting device. As another example, in response to a received request, the computing device may transmit the shuffled file via a Bluetooth connection to another paired device. Such transmissions may be made in association with a file-sharing application or service. In optional block 318, the processor of the computing device may store the shuffled digital file with the public filename, such as by saving the shuffled file to an internal storage device, a remote database, a connected storage drive or device (e.g., external hard drive), etc.

In some embodiments, the computing device may obtain the file and/or otherwise perform shuffling operations of blocks 304-316 in response to receiving a request from another device, such as a request to provide the digital file for downloading via a file-sharing service or application. In other words, shuffling and transmitting the digital file may be done on-demand.

FIG. 3B illustrates an embodiment method 350 for a computing device to un-shuffle (or de-code) data segments of a file based on a hash of a filename associated with the file. In block 352, the processor of the computing device may obtain a shared hash function and a shared, looping reverse-shuffle algorithm (or a reversibly-executed shared, looping shuffle algorithm). The operations in block 352 may be similar to those described above with reference to block 302 of FIG. 3A. In some embodiments, the reverse-shuffle algorithm may be the same algorithm as the shuffle algorithm described above, except that it may be invoked in a different manner, such as by configuring it (e.g., with an input, configuration setting, etc.) to conduct the reverse operations of shuffling data. In some embodiments, the reverse-shuffle algorithm may be a distinct program, application, instructions, code, or other information from the shuffling algorithm. FIG. 2B illustrates an exemplary reverse shuffling application.

In optional block 354, the processor of the computing device may receive a shuffled digital file with a public filename. For example, the computing device may receive a message or packets from another device that include the shuffled digital file. The computing device may receive the shuffled digital file in response to previously transmitting a request (e.g., a download request) to the another device requesting that the shuffled digital file (or the original form of the digital file) be shared with the computing device. The operations in optional block 354 may be optional as the shuffled digital file may already exist on the computing device, such as when the shuffled digital file has been stored in local storage by the computing device.

Figure 4B:
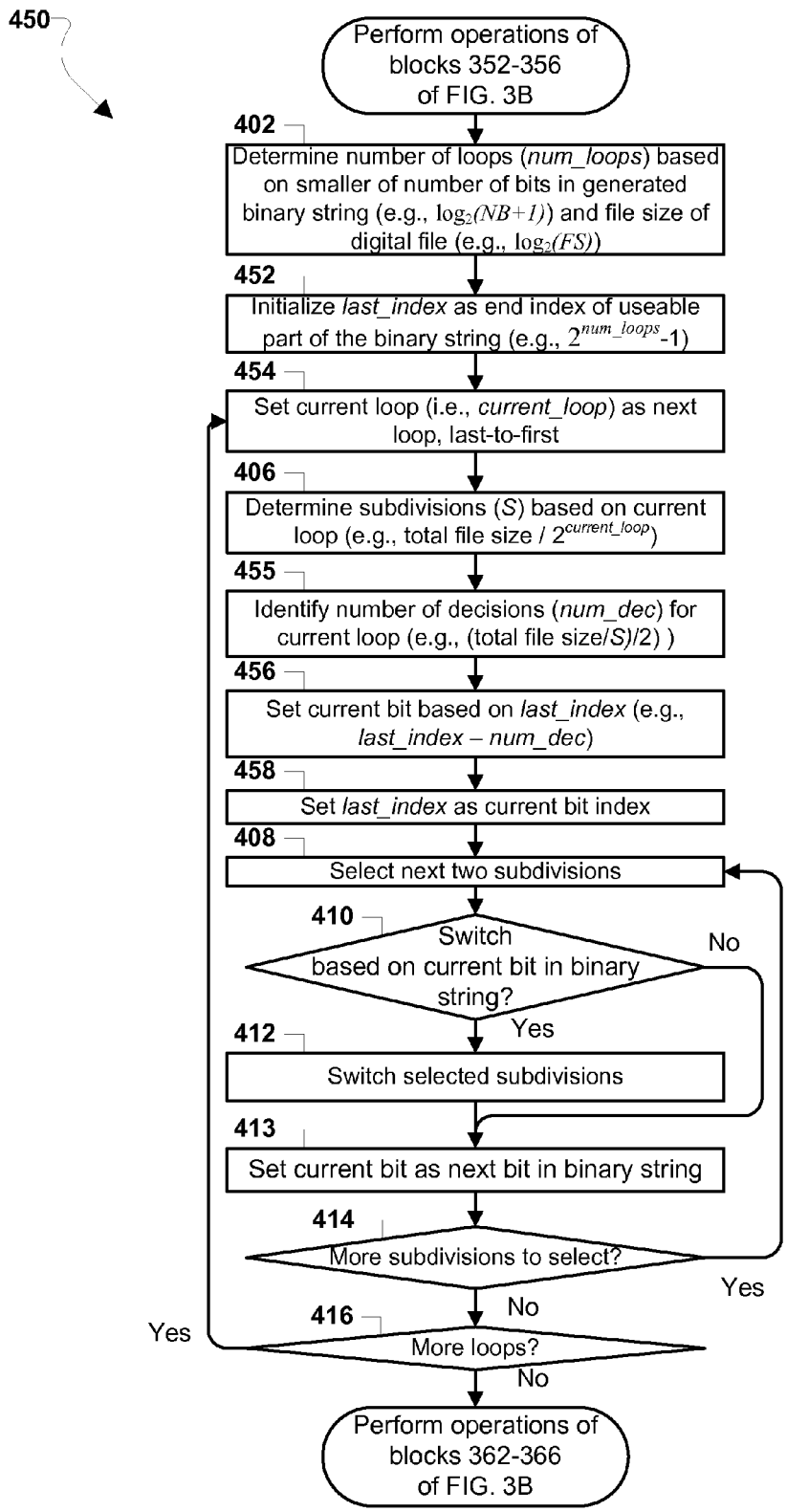
FIG. 4B is a process flow diagram illustrating another embodiment method for a computing device to un-shuffle (or de-code) data segments of a digital file based on a hash output of a filename associated with the digital file.

In block 356, the processor of the computing device may generate a binary string by applying the shared hash function to the public filename of the shuffled digital file. The operations of block 356 may be similar to as described above with reference to block 308 of FIG. 3A. In block 358, the processor of the computing device may subdivide the shuffled digital file into a plurality of data segments corresponding to a number of bits represented by the generated binary string and/or the size of the digital file. The operations of block 358 may be similar to the operations described above with reference to block 310 of FIG. 3A. However, in some embodiments and based on the shuffling/un-shuffling scheme, the computing device may perform an inverse of the subdivision performed by corresponding shuffling operations. For example, when the shuffling operations that began with large data segments that were subdivided to progressively get small, the un-shuffling operations may begin with the small data segments that progressively get larger with iterations of a looping un-shuffling algorithm. FIG. 4B illustrates exemplary operations for subdividing and un-shuffling data segments.

In block 360, the processor of the computing device may un-shuffle the plurality of data segments using the shared, looping reverse-shuffle algorithm (i.e., executing a shuffle algorithm in a reverse manner) in which each un-shuffling operation of the reverse algorithm uses a different bit of the generated binary string in a predefined reverse sequence. The un-shuffling operations may be the reverse of the operations performed to generate the shuffled digital file. In other words, the operations of block 360 may reverse or may "back-out" the data swaps achieved with the operations of block 312 described above with reference to FIG. 3A. For example, as shown in FIG. 2B, the computing device may return data segments to their original order based on whether a corresponding bit of the binary string indicates a swap is needed (i.e., a '1' value) or no swap is needed (i.e., a '0' value).

In optional block 362, the processor of the computing device may remove padding data segments from the un-shuffled data segments. In some embodiments, the computing device may utilize information about padding taken from the shuffled digital file (e.g., from metadata) to determine whether or not padding exists and thus should be removed prior to using the un-shuffled data segments. In some embodiments, the computing device may evaluate the various data segments within the un-shuffled digital file to determine whether any are padding. For example, during un-shuffling operations of blocks 312, the computing device may be configured to analyze each data segment and record whether it is empty or null such that these identified padding segments may be easily removed at the end of the un-shuffling process.

In block 364, the processor of the computing device may combine the un-shuffled plurality of data segments to obtain an un-shuffled (or original) digital file. The operations of block 364 may be similar to the operations of block 314 as described above with reference to FIG. 3A. For example, the computing device may append or link the various data segments to one another in order. In optional block 366, the processor of the computing device may store the un-shuffled digital file with the public filename, such as by saving the un-shuffled (or original) file to an internal storage device, a remote database, a connected storage drive or device (e.g., external hard drive), etc.

FIGS. 4A-4B illustrate embodiment methods 400, 450 for a computing device to shuffle (or encode) and un-shuffle (or decode) data segments of a file based on a hash output of a filename associated with the file. The methods 400, 450 may be similar to the methods 300, 350 described above with reference to FIGS. 3A-3B, except that the methods 400, 450 illustrate more detailed, exemplary operations and calculations for iterating through operational loops to subdivide and shuffle or un-shuffle data segments according to one shuffling scheme. The embodiment methods 400, 450 illustrated in FIGS. 4A-4B may be considered complements to one another, as the method 400 includes operations for shuffling data files that may be reversed by the operations of the method 450. The operations of embodiment methods 400, 450 may be performed by various computing devices, such as user devices (e.g., smartphones, desktops, etc.) and/or servers participating in a file-sharing community. However, a single computing device may be configured to perform the embodiment operations of the method 400 and/or method 450, such as to store files in memory in obscured format. In some embodiments, the operations of the methods 400, 450 may be performed as part of a file-sharing application, such as a routine or protocol implemented to handle incoming and/or out-going files shared with other members of a file-sharing community. In some embodiments, the methods 400, 450 may be utilized for improving security of locally stored data, such as by shuffling and un-shuffling files that are archived or otherwise stored within a database or data structure within or accessible to a server, etc.

FIG. 4A illustrates the embodiment method 400 for a computing device to shuffle (or encode) data segments of a file based on a hash output of a filename associated with the file. The computing device may perform the operations of blocks 302-308 as described above with reference to FIG. 3A. In block 402, the processor of the computing device may determine a number of loops (num_loops) to perform in obscuring the file based on the smaller of a number of bits in the generated binary string and the file size of the digital file. An exemplary technique for calculating the total number of loops (or "maxdepth") is illustrated by the pseudo-code shown in FIG. 5. In some embodiments, the computing device may pad the binary string to ensure it has a length in bits equal to a power of two (e.g., 2, 4, 8, 16, etc.). In some embodiments, the number of loops based on the file size of the digital file may further depend on a minimum data segment size, such as a predefined size that the shuffling algorithm may utilize for swapping data segments.

In some embodiments, the number of loops may be calculated by comparing the results of calculations based on file size and number of bits in the binary string. For example, the computing device may calculate $\lfloor \log_2(FS) \rfloor$, where FS is the total size of the digital file (e.g., 512 KB, etc.) divided by a minimum segment size (e.g., 64 KB, etc.) and "$\lfloor \ \rfloor$" is a floor function that returns an integer. Such a minimum segment size may be predefined (e.g., a minimum possible segment size, etc.) or defined based on a preferred security level. For example, a higher security setting associated with a file-sharing application may indicate that the minimum segment size is smaller (e.g., 8 KB) whereas a low security application may indicate the minimum segment size is larger (e.g., 256 KB). The computing device may also calculate $\lfloor \log_2(NB+1) \rfloor$, where NB is the number of bits in the binary string and "$\lfloor \ \rfloor$" is a floor function that returns an integer. The smaller of the two calculations may be the number of times to execute the operational loop of the shuffling algorithm.

As an illustration, when NB has a value of '7' (e.g., the hash output 204 of FIG. 2A), the total file size is 512 KB, and the minimum segment size is 64 KB, the number of loops may be determined to be '3', as:

$$\lfloor \log_2(NB+1) \rfloor = \lfloor \log_2(7+1) \rfloor = 3, \text{ and}$$

$$\lfloor \log_2 FS \rfloor = \lfloor \log_2(512 \text{ KB} \div 64 \text{ KB}) \rfloor = \lfloor \log_2(16) \rfloor = 4.$$

Thus, the number of loops may be three, as $\lfloor \log_2(NB+1) \rfloor$ (i.e., 3) is less than $\lfloor \log_2 FS \rfloor$ (i.e., 4). In other words, the number of bits in the binary string may only support three loops of parsing and swapping the file.

In block 403, the processor of the computing device may set a current bit as the first bit (or the bit corresponding to the first index) in the binary string, such as by setting the current bit to the bit in index '0' of the binary string. In block 404, the processor of the computing device may set a current loop (or loop counter) as the next loop in a first-to-last sequence or order. For the first iteration of the algorithm, the next loop may be the first loop.

In block 406, the processor of the computing device may determine the subdivisions (e.g., an S variable) of the digital file based on the current loop. In other words, the computing device may identify the various data segments of a particular size for the current loop of the algorithm. For example, the subdivisions for the current loop may be identified by calculating the total file size of the digital file divided by two to the power of the current loop value (i.e., file size/$2^{current\_loop}$, where current_loop is the current loop counter value). For example, when the current loop is the first loop (i.e., current_loop==1), and the total file size is 512 KB, the subdivisions may be determined as 512 KB/($2^1$)=256 KB (i.e., each of the data segments to be shuffled in the current loop are 256 KB in size).

In block 408, the processor of the computing device may select the next two subdivisions. For example, when there are only two subdivisions of the digital file for the current loop, both subdivisions may be selected. In determination block 410, the processor of the computing device may determine whether to switch (or shuffle) the selected two subdivisions based on the current bit in binary string. For example, if the set current bit has a value of '1', the computing device may determine that it should swap the selected subdivisions, but if the current bit value is '0', the computing device may determine that it should not swap the selected subdivisions. In response to determining that the current bit in the binary string indicates that a switch should occur (i.e., determination block 410="Yes"), the processor of the computing device may switch the selected subdivisions in block 412. For example, a second subdivision (or data segment) may be placed in front of a first subdivision.

In response to determining that the current bit in the binary string indicates that no switch should occur (i.e., determination block 410="No"), or in response to performing the operations in block 412, the processor of the computing device may set the current bit the next bit in the binary string in block 413.

In determination block 414, the processor of the computing device may determine whether there are more subdivisions to select for the current loop. In other words, the computing device may determine whether all subdivisions of the current loop have been selected and evaluated. For example, when there are eight total subdivisions in the current loop of the algorithm and the currently selected two subdivisions are the fifth and sixth subdivisions, then there are still the seventh and eighth subdivisions to select and possibly swap, so the computing device may determine there are more subdivisions to select. In response to determining that there are more subdivisions to select for the current loop (i.e., determination block 414="Yes"), the computing device may continue with the selecting operations in block 408 and select the next two subdivisions.

In response to determining that there are no more subdivisions to select for the current loop (i.e., determination block 414="No"), the processor of the computing device may determine whether there are more loops to execute for the algorithm in determination block 416. For example, the computing device may evaluate the current_loop value to determine whether it is less than or equal to the calculated total number of loops (i.e., num_loops) and thus whether there are more loops of the algorithm to be performed. In response to determining that there are more loops to execute (i.e., determination block 416="Yes"), the processor of the computing device may continue with the setting operations in block 404.

In response to determining that there are no more loops to execute (i.e., determination block 416="No"), the computing device may continue with the operations of blocks 314-318 as described above with reference to FIG. 3A, including combining the shuffled data segments into a shuffled digital file, optionally transmitting the shuffled digital file, and optionally storing the shuffled digital file.

FIG. 4B illustrates an embodiment method 450 for a computing device to un-shuffle (or de-code) data segments of a file based on a hash output of a filename associated with the file. The computing device may perform the operations of blocks 352-356 and 402 as described above with reference to FIG. 3B and FIG. 4A respectively. In block 452, the processor of the computing device may initialize a last index (i.e., last_index variable) as an end index of the useable part of the binary string. In other words, the last_index may be the end of the binary string when the number of loops to execute the un-shuffling algorithm (num_loops) is based on the binary string length. Alternatively, the last_index may be an index of the binary string that corresponds to the total number of un-shuffling operations needed for all loops based on the total file size as described above with reference to block 402 of FIG. 4A. Such a last_index variable may be used by the computing device as an indicator of where previous iterations of the operational loop left off in evaluating subdivisions of the digital file, and thus may provide an index to count backwards from to reach the next bit index in the binary string for use with subdivisions for a subsequent loop.

In some embodiments, the computing device may calculate $2^{num\_loops}-1$ to identify the last_index (i.e., the end index of the useable part of the binary string). For example, when the number of loops is calculated to be a value of '3', the end index may be $2^3-1=7$, and thus the last_index variable may be set to a value of '7'.

In block 454, the processor of the computing device may set a current loop as the next loop in a last-to-first sequence or order. In other words, on the first or initial iteration of the operational loop, the current_loop variable may be set to the total number of loops (i.e., num_loops), and for each subsequent iteration, the current_loop may be decremented (i.e., from last to first). For example, if the number of loops (or num_loops) is calculated to be a value of '3', the current_loop may be set to a value of '3' on the initial run or iteration of the operations of the algorithm, set to a value of '2' on the next iteration, and set to a value of '1' on the last iteration. As described above, in block 406, the processor of the computing device may determine subdivisions (e.g., an S variable) based on the current loop, for example by calculating (total file size/$2^{current\_loop}$).

In block 455, the processor of the computing device may identify the number of decisions (e.g., a num_dec variable) that are needed for determining whether to un-shuffle subdivisions of the current loop. The number of decisions may be identified by calculating ((total file size/S)/2). In other words, the computing device may perform an un-shuffling decision for each pair of subdivisions for the current loop. For example, when the current loop has a value of '3', the total file size is 512 KB, and the subdivision (S) is 64 KB (i.e., a pair of subdivisions is 128 KB combined), the number of decisions for the loop (num_dec) may be equal to (512 KB/64 KB)/2)=8/2=4 decisions. In other words, four (4) bits may be needed to process the un-shuffling of the subdivisions of the current loop.

The exemplary un-shuffling scheme of method 450 (e.g., as illustrated in FIG. 2B) moves from end to beginning in the binary string. So, in block 456, the processor of the computing device may set the current bit based on the last_index variable. In particular, the starting index in the binary string for each iteration of the looping algorithm may be set so that there are enough previously unused bits in the binary string to allow the number of decisions (num_dec) needed for to un-shuffle the subdivisions of the current loop. In other words, the current bit may be set to the index of the binary string that is a number of bits (num_dec) preceding an already utilized bit so that each determination to un-shuffle subdivision pairs may be done with an unused bit. In particular, the current bit may be set by calculating (last_index−num_dec). For example, when the length of the bit string is seven bits long (e.g., "1010101" with indices 0-6), the last_index is set to index '7' (i.e., the index after the last bit in index '6'), and the number of decisions (num_dec) for the current loop is four (4) (i.e., there are four pairs of subdivisions to evaluate), then the current bit may be set to the bit at index '3' of the binary string (e.g., 7−4=3). In block 458, the processor of the computing device may set the last index (i.e., last_index variable) as the set bit index for the current bit. Such a setting of the last_index variable may indicate the end index for use in the next iteration of the operational loop of the algorithm (e.g., when the current_loop value is next changed).

The computing device may then perform the operations of blocks 408-416 as described above with reference to FIG. 4A and blocks 362-364 as described above with reference to FIG. 3B.

FIG. 5 illustrates exemplary pseudocode 500 for implementing a shuffling algorithm that uses a binary string as an input according to some embodiments. The pseudocode 500 is merely an illustration of one possible implementation of embodiment techniques, and thus may not be code that includes syntax or other characteristics that may actually be compiled or otherwise executable. The example pseudocode 500 provides one example of an algorithm for shuffling data, but does not include instructions for un-shuffling data. However, an un-shuffling algorithm may use the embodiment methods described above. The example pseudocode 500 is not intended to limit other designs, structures, coding schemes, and/or other specific implementations that may also shuffle data segments of a file using a filename hash output.

Figure 6:
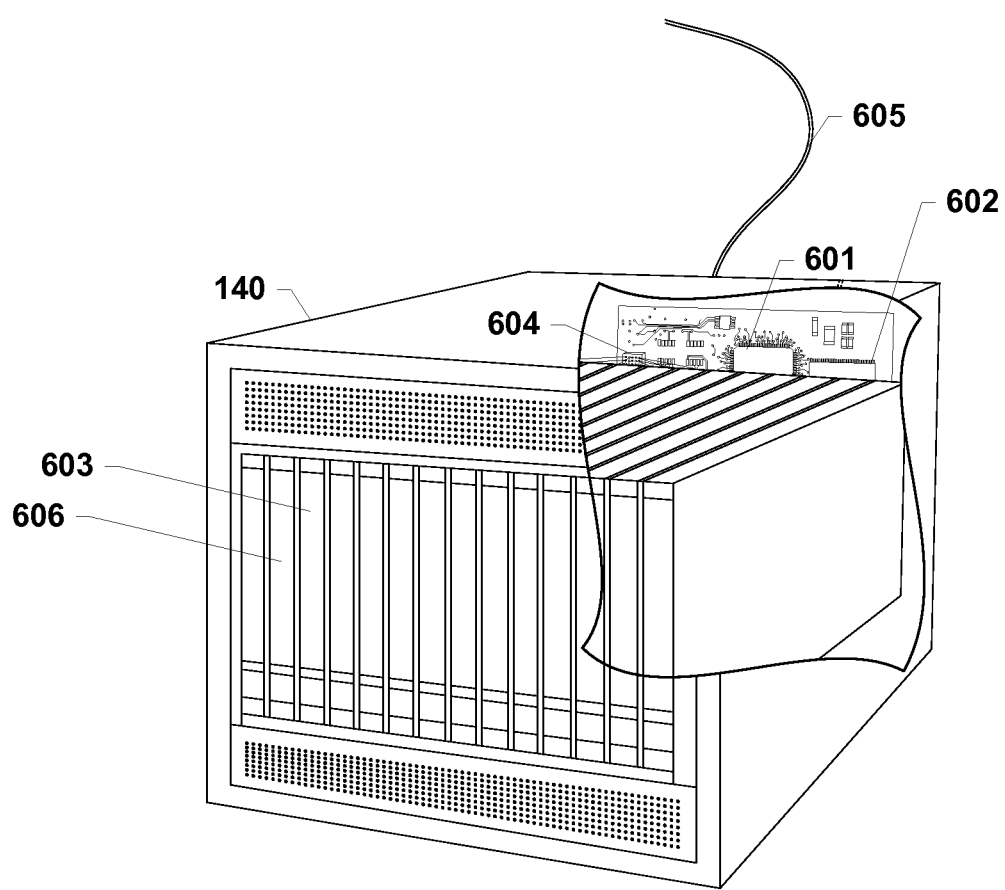
FIG. 6 is a component block diagram of a server computing device suitable for use in some embodiments.

Various forms of computing devices, including personal computers, mobile computing devices (e.g., smartphones, etc.), servers, laptop computers, etc., may be used to implement the various embodiments. Such computing devices may typically include, at least, the components illustrated in FIG. 6 which illustrates an example server computing device. Such a computing device 140 may typically include a processor 601 coupled to volatile memory 602 and a large capacity nonvolatile memory, such as a disk drive 603. The computing device 140 may also include a floppy disc drive, compact disc (CD) or DVD disc drive 606 coupled to the processor 601. The computing device 140 may also include network access ports 604 (or interfaces) coupled to the processor 601 for establishing data connections with a network 605, such as the Internet and/or a local area network coupled to other system computers and servers.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a computing device to reversibly obfuscate contents of a digital file, comprising:
    generating, by a micro-processor of the computing device, a binary string by applying a shared hash function to a public filename of a digital file that is stored in a memory of the computing device in an unshuffled configuration;
    subdividing, by the micro-processor of the computing device, the digital file into a first plurality of data segments corresponding to one of a number of bits represented by the generated binary string and a file size of the digital file;
    shuffling, by the micro-processor of the computing device, the first plurality of data segments using a shared, looping shuffle algorithm, wherein each shuffling operation of the shared, looping shuffle algorithm uses a different bit of the generated binary string in a predefined first sequence; and
    combining, by the micro-processor of the computing device, the shuffled first plurality of data segments to obtain a shuffled digital file that is stored according to the shuffled configuration in the memory.

2. The method of claim 1, further comprising:
    subdividing, by the micro-processor of the computing device, the shuffled digital file into a second plurality of data segments corresponding to one of the number of bits represented by the generated binary string and the file size of the digital file;
    un-shuffling, by the micro-processor of the computing device, the second plurality of data segments by executing the shared, looping shuffle algorithm in a reverse manner, wherein each un-shuffling operation of the reversibly-executed shared, looping shuffle algorithm uses a different bit of the generated binary string in a predefined reverse sequence; and
    combining, by the micro-processor of the computing device, the un-shuffled second plurality of data segments to obtain the digital file that is stored in the memory in the unshuffled configuration.

3. The method of claim 2, further comprising removing, by the micro-processor of the computing device, padding data segments from the un-shuffled second plurality of data segments.

4. The method of claim 1, further comprising padding, by the micro-processor of the computing device, the digital file to have a total size equal to a power of two.

5. The method of claim 1, further comprising transmitting, by the micro-processor of the computing device, the shuffled digital file with the public filename to another computing device.

6. The method of claim 1, further comprising reversibly executing, by the micro-processor the computing device, the shared, looping shuffle algorithm on the shuffled digital file using the shared hash function and the public filename to obtain the digital file.

7. The method of claim 6, wherein the shuffled digital file is obtained from memory by the micro-processor of the computing device.

8. The method of claim 1, wherein the shared hash function and the shared, looping shuffle algorithm are associated with a file-sharing application.

9. A computing device, comprising:
    a memory;
    a micro-processor coupled to the memory and configured with processor-executable instructions to perform operations comprising:
        generating a binary string by applying a shared hash function to a public filename of a digital file that is stored in the memory in an unshuffled configuration;
        subdividing the digital file into a first plurality of data segments corresponding to one of a number of bits represented by the generated binary string and a file size of the digital file;
        shuffling the first plurality of data segments using a shared, looping shuffle algorithm, wherein each shuffling operation of the shared, looping shuffle algorithm uses a different bit of the generated binary string in a predefined first sequence; and
        combining the shuffled first plurality of data segments to obtain a shuffled digital file that is stored according to a shuffled configuration in the memory.

10. The computing device of claim 9, wherein the micro-processor is configured with processor-executable instructions to perform operations further comprising:

subdividing the shuffled digital file into a second plurality of data segments corresponding to one of the number of bits represented by the generated binary string and the file size of the digital file;

un-shuffling the second plurality of data segments by executing the shared, looping shuffle algorithm in a reverse manner, wherein each un-shuffling operation of the reversibly-executed shared, looping shuffle algorithm uses a different bit of the generated binary string in a predefined reverse sequence; and combining the un-shuffled second plurality of data segments to obtain the digital file that is stored in the memory in an unshuffled configuration.

11. The computing device of claim 10, wherein the micro-processor is configured with processor-executable instructions to perform operations further comprising removing padding data segments from the un-shuffled second plurality of data segments.

12. The computing device of claim 9, wherein the micro-processor is configured with processor-executable instructions to perform operations further comprising padding the digital file to have a total size equal to a power of two.

13. The computing device of claim 9, wherein the micro-processor is configured with processor-executable instructions to perform operations further comprising transmitting the shuffled digital file with the public filename to another computing device.

14. The computing device of claim 9, wherein the micro-processor is configured with processor-executable instructions to perform operations further comprising reversibly executing the shared, looping shuffle algorithm on the stored shuffled digital file using the shared hash function and the public filename to obtain the digital file.

15. The computing device of claim 14, wherein the shuffled digital file is obtained from memory by the micro-processor of the computing device.

16. The computing device of claim 9, wherein the shared hash function and the shared, looping shuffle algorithm are associated with a file-sharing application.

17. A computing device, comprising:

means for generating a binary string by applying a shared hash function to a public filename of a digital file that is stored in a memory of the computing device in an unshuffled configuration;

means for subdividing the digital file into a first plurality of data segments corresponding to one of a number of bits represented by the generated binary string and a file size of the digital file;

means for shuffling the first plurality of data segments using a shared, looping shuffle algorithm, wherein each shuffling operation of the shared, looping shuffle algorithm uses a different bit of the generated binary string in a predefined first sequence; and means for combining the shuffled first plurality of data segments to obtain a shuffled digital file that is stored according to a shuffled configuration in the memory.

18. The computing device of claim 17, further comprising:

means for subdividing the shuffled digital file into a second plurality of data segments corresponding to one of the number of bits represented by the generated binary string and the file size of the digital file;

means for un-shuffling the second plurality of data segments by executing the shared, looping shuffle algorithm in a reverse manner, wherein each un-shuffling operation of the reversibly-executed shared, looping shuffle algorithm uses a different bit of the generated binary string in a predefined reverse sequence; and means for combining the un-shuffled second plurality of data segments to obtain the digital file that is stored in the memory in the unshuffled configuration.

19. The computing device of claim 18, further comprising means for removing padding data segments from the un-shuffled second plurality of data segments.

20. The computing device of claim 17, further comprising means for padding the digital file to have a total size equal to a power of two.

21. The computing device of claim 17, further comprising means for transmitting the shuffled digital file with the public filename to another computing device.

22. The computing device of claim 17, further comprising means for reversibly executing the shared, looping shuffle algorithm on the shuffled digital file using the shared hash function and the public filename to obtain the digital file.

23. The computing device of claim 22, further comprising means for obtaining the shuffled digital file from memory of the computing device.

24. The computing device of claim 17, wherein the shared hash function and the shared, looping shuffle algorithm are associated with a file-sharing application.

25. A non-transitory processor-readable storage medium having stored thereon processor-executable instructions configured to cause a processor of a computing device to perform operations comprising:

generating a binary string by applying a shared hash function to a public filename of a digital file that is stored in a memory of the computing device in an unshuffled configuration;

subdividing the digital file into a first plurality of data segments corresponding to one of a number of bits represented by the generated binary string and a file size of the digital file;

shuffling the first plurality of data segments using a shared, looping shuffle algorithm, wherein each shuffling operation of the shared, looping shuffle algorithm uses a different bit of the generated binary string in a predefined first sequence; and combining the shuffled first plurality of data segments to obtain a shuffled digital file that is stored in a shuffled configuration in the memory.

26. The non-transitory processor-readable storage medium of claim 25, wherein the stored processor-executable instructions are configured to cause the processor of the computing device to perform operations further comprising:

subdividing the shuffled digital file into a second plurality of data segments corresponding to one of the number of bits represented by the generated binary string and the file size of the digital file;

un-shuffling the second plurality of data segments by executing the shared, looping shuffle algorithm in a reverse manner, wherein each un-shuffling operation of the reversibly-executed shared, looping shuffle algorithm uses a different bit of the generated binary string in a predefined reverse sequence; and combining the un-shuffled second plurality of data segments to obtain the digital file that is stored in the memory in the unshuffled configuration.

27. The non-transitory processor-readable storage medium of claim 25, wherein the stored processor-executable instructions are configured to cause the processor of the computing device to perform operations further comprising padding the digital file to have a total size equal to a power of two.

28. The non-transitory processor-readable storage medium of claim 25, wherein the stored processor-executable instructions are configured to cause the processor of the computing device to perform operations further comprising reversibly executing the shared, looping shuffle algorithm on the shuffled digital file using the shared hash function and the public filename to obtain the digital file.

* * * * *